United States Patent
Al-Sulaiman

(10) Patent No.: US 10,378,519 B1
(45) Date of Patent: *Aug. 13, 2019

(54) METHOD FOR GENERATING ELECTRICAL POWER USING A SOLAR CHIMNEY HAVING AN INFLATABLE FRESNEL LENS

(71) Applicant: KING FAHD UNIVERSITY OF PETROLEUM AND MINERALS, Dhahran (SA)

(72) Inventor: Fahad Abdulaziz Al-Sulaiman, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 16/409,264

(22) Filed: May 10, 2019

Related U.S. Application Data

(63) Continuation of application No. 15/843,910, filed on Dec. 15, 2017.

(51) Int. Cl.
| | |
|---|---|
| *F03G 6/06* | (2006.01) |
| *H02K 7/18* | (2006.01) |
| *F03G 6/04* | (2006.01) |
| *F01D 15/10* | (2006.01) |
| *F24S 23/30* | (2018.01) |
| *F24S 80/20* | (2018.01) |

(52) U.S. Cl.
CPC ............ *F03G 6/045* (2013.01); *F01D 15/10* (2013.01); *F24S 23/31* (2018.05); *F24S 80/20* (2018.05); *H02K 7/1823* (2013.01)

(58) Field of Classification Search
CPC ......... F03G 6/045; F24S 23/31; H02K 7/1823
See application file for complete search history.

(56) References Cited

U.S. PATENT DOCUMENTS

| | | | |
|---|---|---|---|
| 4,002,032 A | 1/1977 | Bash | |
| 4,275,309 A | 6/1981 | Lucier | |

(Continued)

FOREIGN PATENT DOCUMENTS

| | | |
|---|---|---|
| CN | 202176465 U | 3/2012 |
| CN | 104879285 A | 9/2015 |

(Continued)

OTHER PUBLICATIONS

"Solar Thermal generated electricity—Future dominating technology?", http://physics.muni.cz/~gszasz/download/janka/solar-thermal-electricity/, Mar. 25, 2016, 6 pages.

*Primary Examiner* — Tulsidas C Patel
*Assistant Examiner* — S. Mikailoff
(74) *Attorney, Agent, or Firm* — Oblon, McClelland, Maier & Neustadt, L.L.P.

(57) ABSTRACT

Solar chimney and method for generating power by the solar chimney are provided. The solar chimney includes a chimney a heat absorbing surface; a transparent cover located above the surface and forming an air pathway with the surface to the entrance to the chimney; one or more integrated turbine-generators at or before the entrance to the chimney for producing electrical power; and a focusing lens focusing solar radiation on a heat exchanging element to heat air at or just before the entrance to the chimney as it flows to the one or more turbines.

6 Claims, 7 Drawing Sheets

(56) References Cited

U.S. PATENT DOCUMENTS

| | | | |
|---|---|---|---|
| 4,331,042 A | 5/1982 | Anderson | |
| 4,433,544 A | 2/1984 | Wells | |
| 4,452,046 A | 6/1984 | Valentin | |
| 4,723,535 A | 2/1988 | Lew | |
| 4,935,639 A | 6/1990 | Yeh | |
| 5,300,817 A | 4/1994 | Baird | |
| 5,381,048 A | 1/1995 | Baird | |
| 5,395,598 A | 3/1995 | Prueitt | |
| 6,111,190 A * | 8/2000 | O'Neill | B64G 1/443 |
| | | | 136/246 |
| 6,590,300 B1 | 7/2003 | Preito Santiago | |
| 7,779,635 B2 | 8/2010 | Lin | |
| 7,956,487 B2 | 6/2011 | Hovakimian | |
| 8,482,148 B2 | 7/2013 | Kobayashi | |
| 9,097,241 B1 | 8/2015 | Hollick et al. | |
| 9,997,978 B2 | 6/2018 | Hovakimian | |
| 2004/0148933 A1 | 8/2004 | Miller | |
| 2004/0237524 A1 | 12/2004 | Thiagarajan | |
| 2007/0245730 A1 | 10/2007 | Mok | |
| 2008/0156317 A1 | 7/2008 | Yangpichit | |
| 2008/0314058 A1 | 12/2008 | Jones | |
| 2009/0107146 A1 | 4/2009 | Lin | |
| 2010/0018205 A1 | 1/2010 | Chen | |
| 2010/0071869 A1 | 3/2010 | Lovisa | |
| 2010/0154863 A1 * | 6/2010 | Bennett | H01L 31/0547 |
| | | | 136/246 |
| 2010/0244449 A1 | 9/2010 | Lee | |
| 2010/0314879 A1 | 12/2010 | Otsuka | |
| 2011/0021134 A1 | 1/2011 | Zwern | |
| 2011/0074164 A1 | 3/2011 | Kobayashi | |
| 2014/0054896 A1 | 2/2014 | Ung | |
| 2015/0167551 A1 | 6/2015 | Lenk et al. | |
| 2016/0097374 A1 | 4/2016 | Hallick | |

FOREIGN PATENT DOCUMENTS

| | | |
|---|---|---|
| CN | 104528853 B | 8/2016 |
| EP | 1830061 A2 | 9/2007 |

* cited by examiner (a)　　　　　　　　　　(b)

METHOD FOR GENERATING ELECTRICAL POWER USING A SOLAR CHIMNEY HAVING AN INFLATABLE FRESNEL LENS

CROSS-REFERENCE TO RELATED APPLICATIONS

The present application is a Continuation of Ser. No. 15/843,910, now allowed, having a filing date of Dec. 15, 2017.

FIELD OF DISCLOSURE

The present disclosure relates generally to a solar chimney for power production, and in particular a solar chimney that uses a focusing lens to increase solar radiation.

BACKGROUND

A solar chimney system (known also as a solar updraft tower) is of interest because it has a basic structure that can produce power using solar energy input. However, a solar chimney system generally has low efficiency and is costly. The basic structure of a solar chimney system consists of a transparent cover, an absorbing plate (or simply the ground), a chimney, and a turbine integrated with an electrical generator. A solar chimney operates by passing solar radiation through the cover and heating the air between the cover and the ground. As the air is heated, its density decreases and moves upward through the chimney (natural convection heat transfer phenomena). The heated air passes through the turbine that is located in the chimney. The turbine is connected with the electrical generator and as the turbine rotates, the generator rotates and generates electricity. One objective of the present disclosure is to address a need for a solar chimney system that has improved efficiency without significant added costs.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
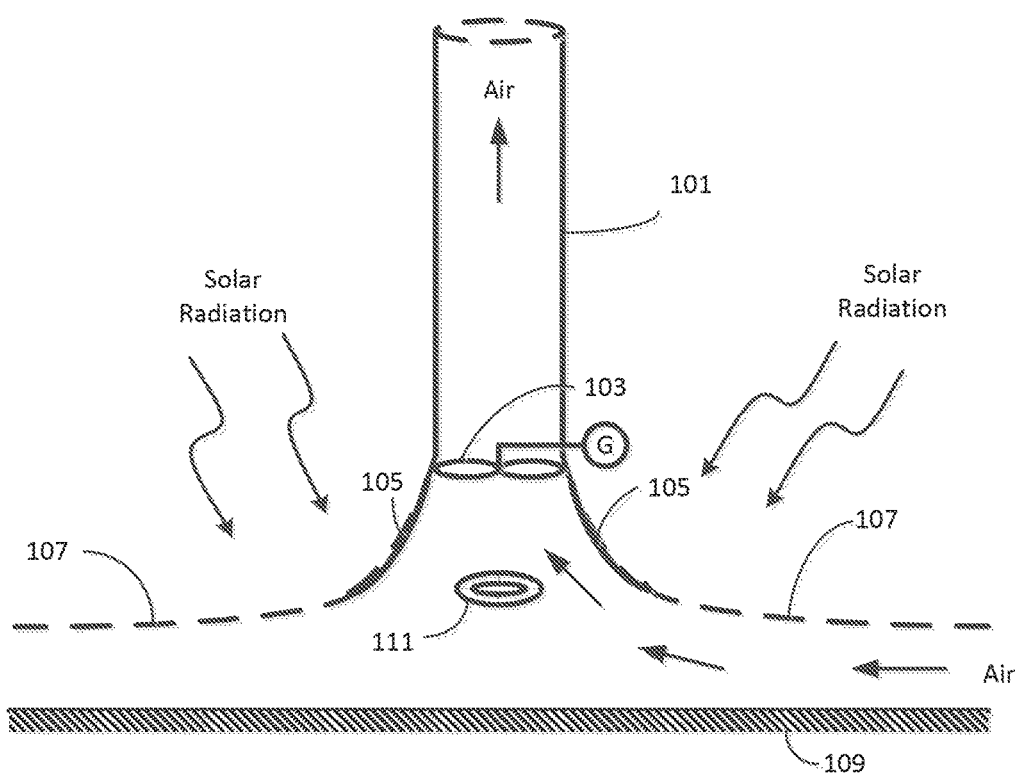
FIG. 1 is a schematic that shows a solar chimney incorporated with a Fresnel lens in accordance with an example aspect of the present disclosure.

Referring now to the drawings, wherein like reference numerals designate identical or corresponding parts throughout several views, the following description relates to a solar chimney system having increases in efficiency of converting solar radiation into electrical power. A solar chimney system converts solar radiation into heat energy at a conversion efficiency that is based on a solar receiver, then converts the heat energy into mechanical energy at an efficiency of a turbine, then converts mechanical energy into electrical energy at an efficiency of an electrical generator. Typically, solar chimney systems have a power conversion efficiency that is much lower than other approaches for solar power conversion such as photovoltaic solar power plants. Photovoltaic panels have a conversion efficiency of 8 to 15 percent, whereas a solar chimney system may have only 1 to 2 percent conversion of solar radiation to usable power.

The lower conversion efficiency of a solar chimney system may be offset by lower cost per square meter of solar collection. Solar chimney systems typically include a chimney tower, a transparent cover that forms a greenhouse-type solar collector, and an integrated turbine-generator. Solar radiation on an average hot day is about 1000 W/sq m. The transmittance of the transparent cover is about 95% and the reflectance is about 5%. In this case, 90% transmittance of the solar radiation will reach a heat absorbing surface, typically ground, under the cover. It is estimated that a 100 MW solar plant would require a 1,000 m tower and a greenhouse of 20 square kilometers (7.7 sq mi).

Unlike photovoltaic panels, solar chimney systems only require hot air to operate. A solar chimney system can continue to operate when there is no sunlight.

Several aspects are disclosed which include a focusing lens to increase solar radiation that is absorbed in the system, which may include air or a combination of air and water, which in turn increases the power produced by the system in a cost effective manner. The focusing lens functions to focus the solar radiation to specific locations, such as an absorbing heat exchanger, a thermal storage system and/or an open water pool. A Fresnel lens is preferably used as the focusing lens due to its superior ability to be used to concentrate sunlight for heating. Disclosed aspects include a thermal storage system to extend the working period of the turbine beyond periods of sunlight and an open water pool to further increase power produced by the system.

The solar chimney system may achieve electrical energy levels suitable for industrial use. The solar chimney system may be scaled to achieve power levels ranging from a few hundred Watts to several hundred MW. For example, the power output may be in the range of 500 W to 500 MW, 5 MW-100 MW, or preferably 20 MW-50 MW. The solar chimney may also be adapted for use in heating air for houses.

In an embodiment wherein the solar chimney is used to provide heating air for houses, the hot air may be obtained or redirected from several points of the solar chimney. In one embodiment one or more heat exchangers are included inside and/or on the chimney. The heat exchangers function to transfer heat from air that has been heated and is rising through the chimney to a heat transfer medium circulating in the heat exchanger. The heat transfer medium is then pumped or moved by gravity to one or more other locations such as a residence for heating the residence. In other embodiments a heat exchanger is located close to the focusing lens and is heated by a combination of both focused solar radiation and by contact with air heated by focus solar radiation. When the heat exchanger is located in the solar chimney, it may be located at a position greater than one half the height of the solar chimney. The heat exchanger may comprise pipes carrying the heat transfer medium that are installed directly in the walls or on the surface of the inside of the chimney walls for efficient transfer of heat FIG. 1 is a schematic that shows a solar chimney system incorporated with a Fresnel lens in accordance with an example aspect of the present disclosure. Regarding FIG. 1, the solar chimney system includes a chimney (updraft tower) 101, a turbine 103 integrated with an electrical generator, a transparent cover 107, and an absorbing plate (or ground) 109. It is understood that more than one turbine may be incorporated in the solar chimney system. Turbines should be located in an airflow path where there is sufficiently flow velocity to rotate the turbine, and preferably where flow velocity is maximum.

Preferably the turbine is installed at a position in the solar chimney together with one or more directing vents, blades and/or vanes. Preferably the directing vents, blades and/or vanes are installed horizontally and lengthwise in the solar chimney and have a dimension wherein the length is 5-10 times the width of the vents, blades and/or vanes. The vanes are preferably installed in front of the turbines such that they function to direct airflow towards blades of the turbine. In this configuration the vents, blades and/or vanes have a "flower petal-like" arrangement in front of and in an upstream orientation of the turbine. The height of the chimney 101 is one of the factors related to the amount of power generated by the solar chimney system. For example, a 750 m solar chimney has achieved 50 MW, while a 1500 m solar chimney has achieved 400 MW. The chimney is preferably made of a material that can withstand environmental factors depending on what region it is to be located. Typically, solar chimneys are made from cement and steel. Environmental factors can include wind, temperatures, desert sand, or whether the system is arranged on the side of a hill or on level ground. The transparent cover 107 may be made of a transparent plastic or glass. Solar chimney systems of several square miles may be made using the ground for heat absorption.

An aspect is a focusing lens that is included in the a solar chimney system to increase concentration of solar radiation. The focusing lens may be a Fresnel lens 105 that provides superior ability to concentrate light for heating. A Fresnel lens directly heat air and/or can concentrate solar radiation onto an absorbing medium. It is understood that other types of lenses may be used that focus light to specific locations.

A Fresnel lens is an arrangement in which a conventional lens is divided into a set of sections with discontinuities between them. The number of lens sections can be any number, and an ideal Fresnel lens will have infinitely many sections. Although a Fresnel lens may have lower image quality as a result of the discontinuities, it can still focus a source of light. Fresnel lenses have large aperture, short focal length and can capture more oblique light from a light source. As such, Fresnel lens may be used to concentrate sunlight for heating with a ratio of almost 500:1. Also, a Fresnel lens can be made substantially thinner than a standard lens having a continuous surface and can be made of transparent plastic.

Although the Fresnel lens may be placed at various positions along the cover, the location 105 just before or while entering the chimney 101 helps to ensure that hot air enters into the chimney. In some embodiments the range size of the Fresnel lens is 1 m^2 to 5 m^2 and the air temperature inside the chimney system is more than the surrounding temperature (ambient temperature). In some embodiments the Fresnel lens is provided as an inflatable or the erectable configuration. For example, expansion or inflation of a flexible transparent thermoplastic material that may include one or more embossed or cut patterns representing the lens sections of the Fresnel lens. In this respect the Fresnel lens is similar to a tent which, once erected, has a strong solar radiation focusing effect; however, when in collapsed form for example when the transparent thermoplastic material is flat on the ground, the Fresnel lens sections are unable to effectively concentrate solar radiation. In another embodiment the Fresnel lens is provided in an arrangement having a bottom surface that is not expandable (such as a transparent silica glass) and a top layer which is an expandable and transparent thermoplastic material. Injecting air between the two layers functions to inflate or raise the Fresnel lens such that it can effectively function to concentrate solar radiation In some aspects, the solar chimney system may be implemented with an absorbing heat exchanger 111 that may heat the air on a continuous basis as the amount of solar radiation varies. An aspect is a solar chimney system without an absorbing heat exchanger such that the Fresnel lens 105 will heat the air by heat from the ground 109. This arrangement without an absorbing heat exchanger may require a large Fresnel lens to obtain equivalent heat capacity, but provides a simpler system. In the case that the solar chimney system includes an absorbing heat exchanger 111, the position 105 of the Fresnel lens may be such that it will focus solar radiation on the absorbing heat exchanger 111. An aspect may be to include a controller for the Fresnel lens that changes the position of the Fresnel lens to track movement of the direction of solar radiation. In this embodiment of the invention the Fresnel lens is mounted on a frame which may be tilted in two or more axes. A controller functions to maximize the time in which the center point representing the apex of the Fresnel lens is directly in line with the sun. As the sun moves across the horizon during the day the controller functions to change the orientation of the Fresnel lens such that maximal solar radiation concentration is achieved.

The absorbing heat exchanger 111 may contain a fluid that has higher specific heat than air (for example, phase change materials including fresh water, salt water) and thus higher heat capacity. Subsequently, the absorbing heat exchanger 111 will heat the air in a more consistent way. Provided the arrangement in FIG. 1, the input energy to the turbine-generator 103 is increased, which in turn increases the power output from the system.

An aspect is the Fresnel lens located at a position 105 that heats the air just before or while entering the chimney from the bottom using the absorbing heat exchanger 111, which is the hottest location in the chimney system. Heating at this location will draw in air that enters from the outer perimeter of the cover 107. Therefore, placing the Fresnel lens at this position 105 causes the air flow rate to increase, which in turn increases the turbine power. Furthermore, the Fresnel lens can be made of transparent plastic such that it adds little complexity to the system and therefore, is a cost effective solution for improving efficiency.

Preferably the solar chimney is anchored to the ground and/or to the absorbing plate in a manner permitting air to enter the solar chimney at the base. In this embodiment the base of the solar chimney includes a series of arches which permit air to enter at the bottom of the solar chimney directly above the plane of the ground or the absorbing plate. In other embodiments the entry point of air into the solar chimney may be at one or more additional or exclusive locations. For example, entry points for air preferably exist circumferentially around the chimney. The entry points may be arranged such that the structural character of the solar chimney is not compromised. Entry points are preferably in the form of long oblong openings having a length of at least 1.25 times their width and oriented in a lengthwise direction with the length of the chimney. Entry points preferably exist no closer than 1/10 of the height of the chimney from the ground or absorbing plate. In other embodiments the entry points for air include a triangular-shaped "scoops" which may partially protrude from the outer surface of the solar chimney. The scoops are preferably oriented such that the apex or narrow portion is pointed downwardly to the ground or absorbing plate and lengthwise along the solar chimney. Such scoops are preferably positioned circumferentially around the solar chimney in a spiral-type pattern. Preferably the scoops do not extend more than 1/10 of the width the solar chimney at the point at which they are installed and preferably protrude at least 1/20 of the width of the solar chimney at the point at which they are installed.

A practical example of the improvement in efficiency provided by the solar chimney system of the present disclosure may be seen by considering a typical hot day. In a case of a solar chimney without a Fresnel lens, the amount of solar radiation reaching the heat exchanger 111 would typically be 900 W/sq m. Alternatively, in the case of a solar chimney that includes a Fresnel lens, the solar radiation may be focused with ratio of up to 5:1 (i.e., the lens can focus the solar radiation to a selected location up to 5 times). In such case, the amount of the heat reaching the heat exchanger 111 is up to five times (900*5=4000 W/sq m). Subsequently, in the case of a solar chimney that includes a Fresnel lens, the fluid inside the heat exchanger 111 is very hot and can substantially heat the air. Furthermore, since the position 105 that is just below the chimney is the hottest location, the air in this location will have the lowest density and will move up throughout the chimney (natural convection). As the air moves up, more fresh air will be sucked from the outer perimeter of the cover 107. This air movement has a higher velocity than the case of a solar chimney without a Fresnel lens.

For example, the power equation of the wind turbine is a direct function of the air density while the power is a cubic function of velocity (velocity $3^{rd}$ power). That is: Power turbine=½*air density*air velocity$^3$. As the air is heated, its density decreases while its velocity increases (lighter weight). Considering the above equation, power will increase due to an increase in velocity. The case of the solar chimney system that includes a Fresnel lens will heat the air more and thus the density will be lower as compared to a solar chimney that does not include a Fresnel lens. As such, the air velocity at the inlet of the turbine will be higher. Moreover, considering the turbine equation above, power is a cubic function of velocity, and subsequently, there will be significant increase in the power.

Figure 2:
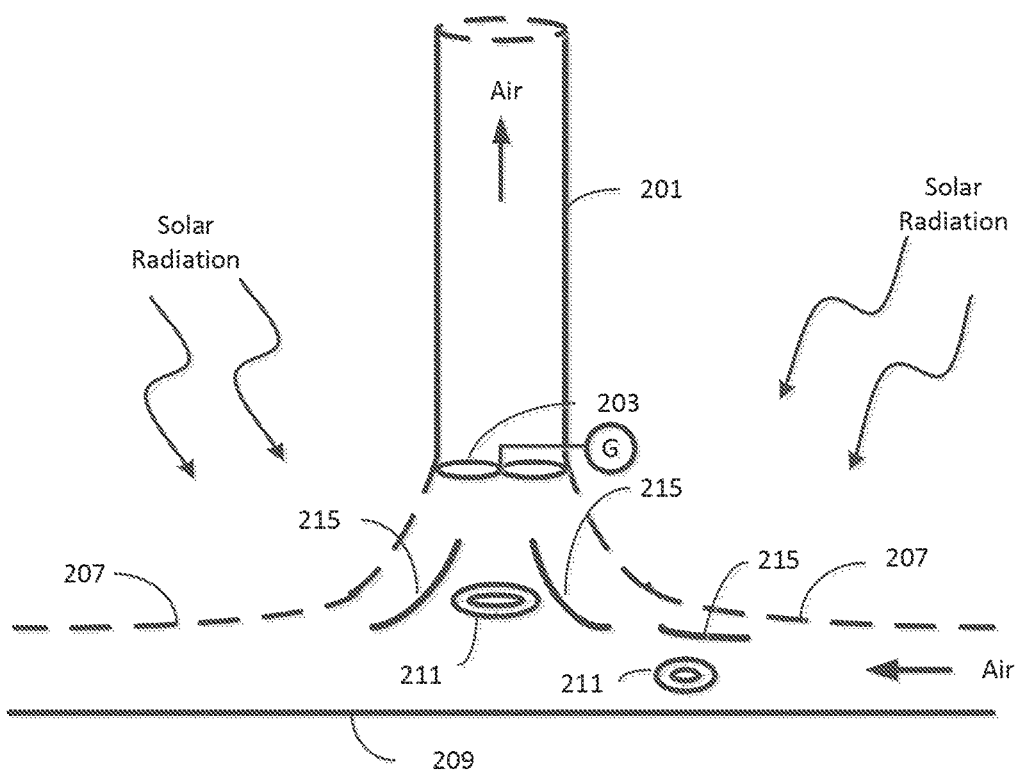
FIG. 2 is a schematic that shows a solar chimney incorporated with a Fresnel lens located below the cover in accordance with an example aspect of the present disclosure.

FIG. 2 is a schematic that shows a solar chimney system incorporated with a Fresnel lens located below the cover in accordance with an example aspect of the present disclosure. The solar chimney includes a chimney 201, a turbine 203, a transparent cover 207, an absorbing plate 209, and one or more absorbing heat exchangers 211 in the air stream. Further regarding FIG. 2, the Fresnel lens 205 may include several portions that are located in several positions: as part of the cover 207 and/or below the cover 207. A Fresnel lens 215 that is located below the cover 207 may be positioned between the cover 207 and the absorbing plate 209. The Fresnel lens 205 located below the cover 207 will heat air passing below the lens as well as heat the fluid in the absorbing heat exchangers 211. Some of the air will pass around the lens portion (hot) while the air passing below it will be heated through both the Fresnel lens 205 and the absorbing heat exchanger 211.

The Fresnel lens located below the cover can be made to be curved in a manner that the Fresnel lens can work as a guide-vane to direct the air toward the chimney. The Fresnel lens serving as the guide vane smoothes the air flow motion. The curved Fresnel lens can guide the hot air near the surface of the cover 207 upward toward the chimney 201 while directing cooler air in a separate area in the vicinity of the heat exchanger 211. In some aspects, the Fresnel lens 205 can work as a semi-transparent surface which focuses some of the radiation and absorbs the rest of the radiation for heat radiation (that is work additionally as an absorbing surface that can emit radiation to heat the air).

Figure 3:
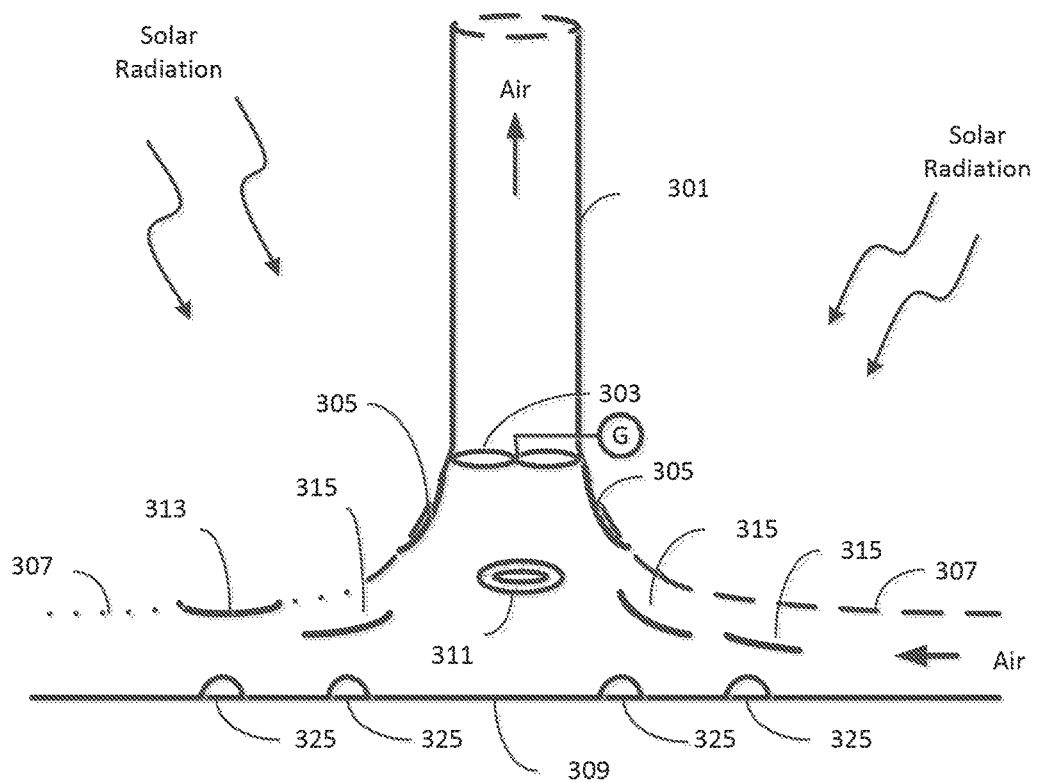
FIG. 3 is a schematic that shows a solar chimney incorporated with a Fresnel lens and storage tubes in accordance with an example aspect of the present disclosure.

FIG. 3 is a schematic that shows a solar chimney system incorporated with a Fresnel lens and energy storage tubes in accordance with an example aspect of the present disclosure. The solar chimney includes a chimney 301, a turbine 303, a transparent cover 307 and one or more absorbing heat exchangers 311 that are positioned in the air flow. Further regarding FIG. 3, Fresnel lens can include lens portions that are located at different positions, including a lens 313 located in the cover 307, a lens 305 located on the cover 307 or lens portions 315 located inside the air flow (below the cover 307 and above the absorbing plate 309). In such embodiments, the Fresnel lens 305 is located at a position that concentrates heat on the absorbing heat exchanger 311, which has fluid with higher specific heat than air.

In another aspect, the solar chimney system may include storage tubes 325 mounted on or below the absorbing plate 309 for thermal energy storage. The tubes 325 may release the stored heat when there is low solar radiation or at night when there is no sunlight. The portions of the Fresnel lens 315 may be positioned to concentrate heat to these tubes 325. The tubes 325 may contain fluid with higher specific heat than air. An outer cover of the tubes 325 may be made of high solar energy absorption material, such as metal. The fluid inside the storage system may be a fluid that has high heat capacity, such as water or salt water. By concentrating solar radiation to the tubes 325, air will be heated high temperatures at the locations of the tubes, which may enhance turbine performance.

Figure 4:
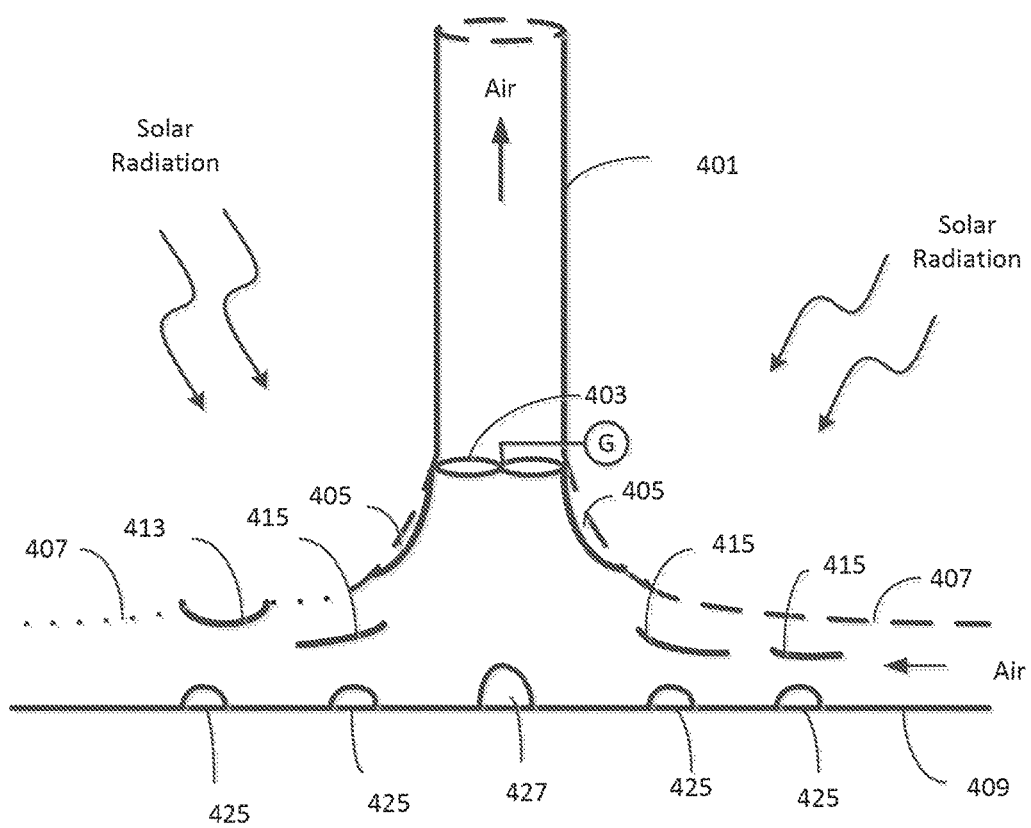
FIG. 4 is a schematic that shows a solar chimney incorporated with a Fresnel lens and a storage system in accordance with an example aspect of the present disclosure.

FIG. 4 is a schematic that shows a solar chimney system incorporated with a Fresnel lens and a thermal energy storage system in accordance with an example aspect of the present disclosure. An aspect is a solar chimney that evenly produces power during periods of no sunlight or low solar radiation, as well as during periods of high solar radiation. The solar chimney may include a chimney 401, a turbine 403, a transparent cover 407 and an absorbing plate 409. Further regarding FIG. 4, the solar chimney has an energy storage system that may include tubes 425 located on the absorbing plate 409 and a tube 427 located directly below the chimney 401. The Fresnel lens may have several portions including a lens portion 413 that is positioned in the cover 407, lens portions 415 positioned within the air flow, and a lens portion 405 positioned just before or at the entry to the chimney 401. The Fresnel lens portions 405, 413, 415 may be located at these various positions to both heat the air and concentrate the heat to the storage system tubes 425, 427. The storage system will release heat when needed (night-time or low solar radiation time). The outer cover of the storage system tubes 425, 427 may be made of high solar energy absorption materials, such as metal. The fluid inside the storage system tubes is a fluid that has higher heat capacity than air, such as water or salt water.

Figure 5:
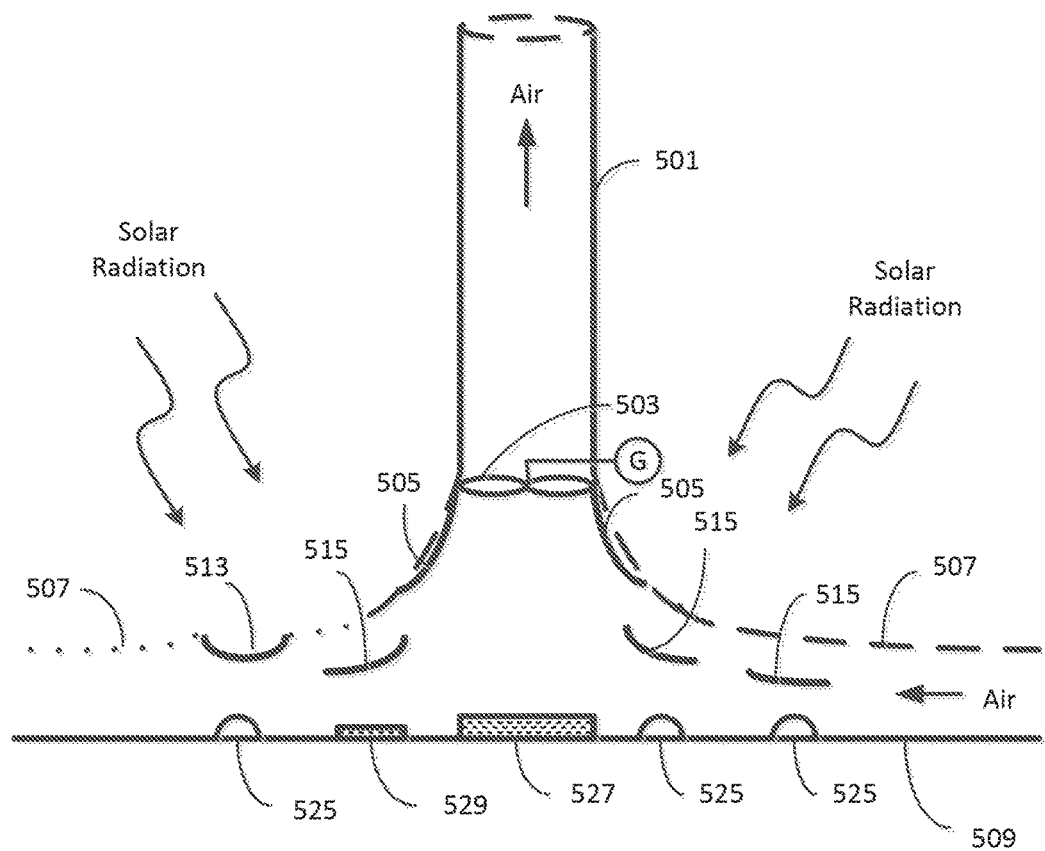
FIG. 5 is a schematic that shows a solar chimney incorporated with a Fresnel lens and a water pool in accordance with an example aspect of the present disclosure.

FIG. 5 is a schematic that shows a solar chimney system incorporated with a Fresnel lens and a water pool in accordance with an example aspect of the present disclosure. In addition to storage tubes 525, an aspect is an open water pool in the solar chimney system. The solar chimney may include a chimney 501, a turbine 503, a transparent cover 507, and an absorbing plate 509. Further regarding FIG. 5, the Fresnel lens may have several portions including a lens portion 505 that may focus solar radiation into an open water pool 527. An aspect is one or more additional open water pools 529. The water in the open water pools 527, 529 will evaporate and the air will become humid. Since water vapor has higher specific heat than air, the humid air (air+water vapor) will help to increase energy output. Also, the Fresnel lens may include a lens portion 513 that is positioned in the cover 507, lens portions 515 positioned within the air flow, and a lens portion 505 positioned just before or at the entry to the chimney 501. The Fresnel lens 505, 513, 515 may be located at these various positions to both heat the air and concentrate the heat to the storage system tubes 515.

In addition to the heat that may be provided by the storage tubes, the humid air due to the water pool 527 will have an increased enthalpy, and the turbine will have a higher input energy and will produce more power. The specific heat (Cp) of water is 4 times the specific heat of air (Cp water=4 kJ/kg° C. while Cp air=1 kJ/kg° C.). Therefore, having a thermal storage tank 527 or tubes 525 with a fluid that has high specific heat will enhance the performance. Provided the Fresnel lens, the heat will be focused on the storage tank (or tubes) five times the case without the Fresnel lens.

Figure 6:
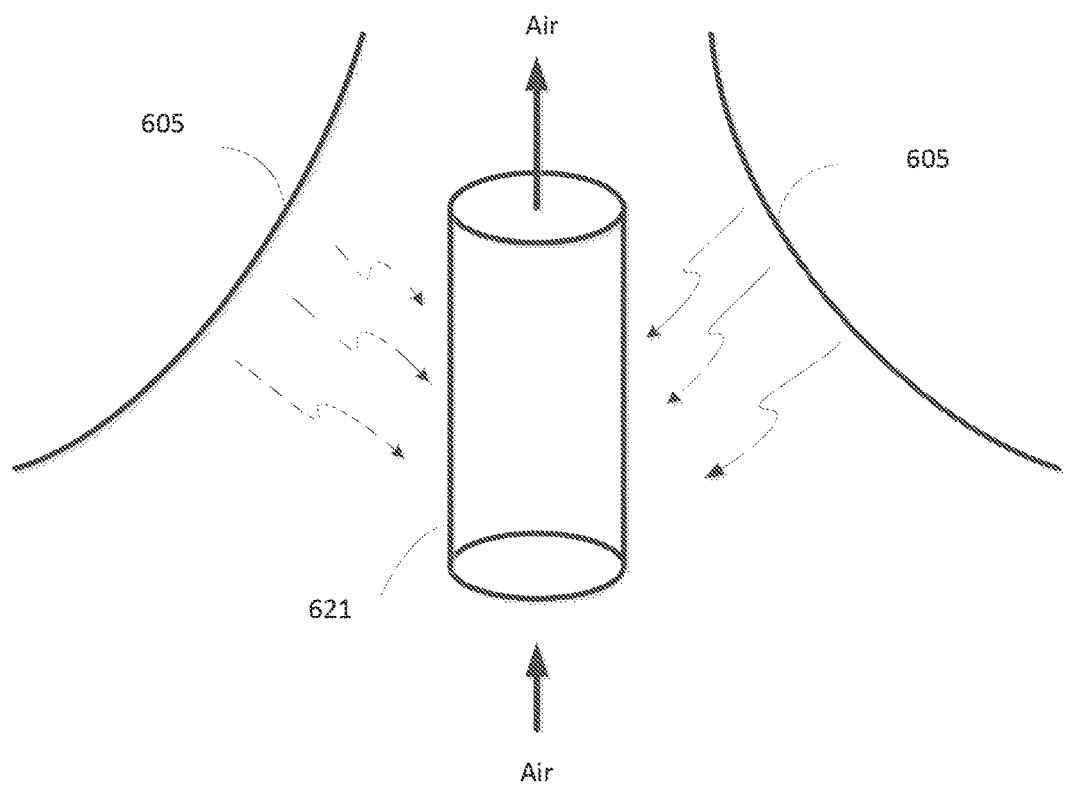
FIG. 6 is a schematic that shows a solar chimney incorporated with a Fresnel lens and a surface with high radiation absorbance material in accordance with an example aspect of the present disclosure.

FIG. 6 is a schematic that shows a solar chimney system incorporated with a Fresnel lens and a surface with high solar energy absorbance material in accordance with an example aspect of the present disclosure. Regarding FIG. 6, a surface 621 with high solar energy absorbance materials can be located in the pathway of the air (as an alternative to the absorbing plate). The shape of the surface may be cylindrical, conical or other similar surfaces. The Fresnel lens 605 will focus the solar radiation to this surface 621. This embodiment will increase the air temperature at a selected location and hence, will provide more energy for the turbine.

Figure 7:
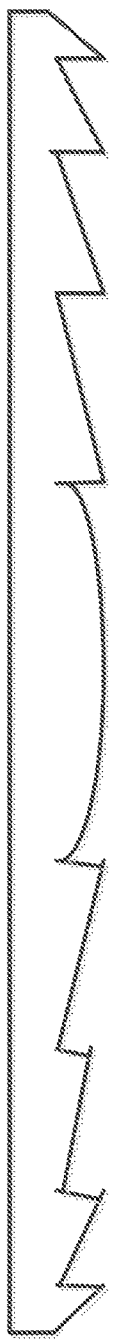
FIG. 7 illustrates forms of a Fresnel lens in accordance with an example aspect of the present disclosure.
Figure 7:
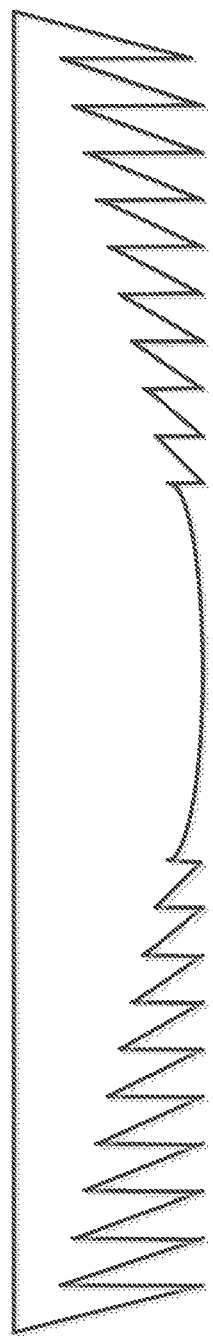

FIG. 7 illustrates forms of a Fresnel lens in accordance with an example aspect of the present disclosure. A Fresnel lens can capture light from an oblique light source and thus is an efficient form of lens for concentrating solar radiation. A Fresnel lens is characterized by dividing the lens into a set of annular sections. The number of annular sections may be varied. The example lens (b) in FIG. 7 has a greater number of annular sections than the lens (a) in FIG. 7. An aspect is to incorporate Fresnel lens portions into the solar chimney with various annular sections depending on the size of the lens portion.

An aspect is a solar chimney system that does not have air exiting the chimney at high temperatures that may harm birds and other life that may come in contact with exhaust air. The size of a Fresnel lens portion should be sufficient to focus solar radiation in a direction of a respective thermal storage component or absorption heat exchanger. It is preferable that the amount of heat absorbed and generated in the solar chimney system be within a temperature range that does not exceed the boiling point of the liquid used for energy storage. In the case of water as the fluid for energy storage, it is preferable that the concentrated solar radiation produced by the Fresnel lens not heat the water above the boiling point of water.

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A concentrated solar method for generating electric power by a solar chimney, the solar chimney including a vertical chimney, a generally horizontal heat absorbing surface located below the chimney, a transparent cover located above the heat absorbing surface and forming an air pathway to the chimney, one or more integrated turbine-generators at an entrance to the chimney, the air pathway extending between an air inlet located at a periphery of the cover and an entrance to the chimney, and an inflatable Fresnel lens made from a flexible thermoplastic material, located adjacent to and upstream of the one or more integrated turbine-generators along the air pathway, the method comprising:
   heating air in the air pathway by solar radiation focused to the heat absorbing surface by the inflatable Fresnel lens to generate maximum air flow velocity at the integrated turbine-generators;
   drawing air from outside the solar chimney by way of the air heating in order to move the air from the air inlet, through the air pathway, and upward to rotate one or more turbines of the one or more integrated turbine-generators;
   directing air flow being drawn from outside by an arrangement of directing vanes positioned in front of and upstream of at least one turbine of the one or more turbines towards blades of the at least one turbine;
   transferring heat in air rising through the chimney to a heat transfer medium circulating in a plurality of pipes in walls of the chimney; and
   generating the electric power by one or more generators of the one or more integrated turbine-generators based on the rotation of the one or more turbines,
   wherein the directing vanes each have a length and a width, wherein the length is in a range of 5 to 10 times the width.

2. The concentrated solar method of claim 1, the solar chimney further including a second Fresnel lens and an absorbing heat exchanger containing a fluid having higher specific heat than air, the absorbing heat exchanger located in the air pathway upstream of the one or more integrated turbine-generators, the method further comprising:

focusing solar radiation by the second Fresnel lens to the absorbing heat exchanger; and further heating the moving air by heat radiated from the absorbing heat exchanger.

3. The concentrated solar method of claim 1, the solar chimney further including a second Fresnel lens and a radiation absorbance surface located in the air pathway upstream of the one or more integrated turbine-generators, the method further comprising:

focusing solar radiation by the second Fresnel lens to the radiation absorbance surface; and further heating the moving air by heat radiated from the radiation absorbance surface.

4. The concentrated solar method of claim 1, solar chimney further including a second Fresnel lens having a plurality of lens portions, the method further including:

guiding air flow of hot air in the air pathway toward the chimney by a subset of the plurality of lens portions of the second Fresnel lens that are arranged below the cover within the air pathway.

5. The concentrated solar method of claim 4, the solar chimney further including a plurality of absorbing heat exchangers located in the air pathway, the method further comprising:

focusing solar radiation by the lens portions to the absorbing heat exchangers.

6. The concentrated solar method of claim 4, wherein the subset of the plurality of lens portions within the air pathway are semi-transparent, the method further comprising:

focusing solar radiation by the semi-transparent lens portions to heat the air in the air pathway;

absorbing radiation of the solar radiation by the semi-transparent lens portions; and subsequently emitting the absorbed radiation to heat air in the air pathway.

\* \* \* \* \*